(12) United States Patent
Suto et al.

(10) Patent No.: US 11,190,597 B1
(45) Date of Patent: Nov. 30, 2021

(54) NETWORK BANDWIDTH SHARING

(71) Applicant: INTERNATIONAL BUSINESS MACHINES CORPORATION, Armonk, NY (US)

(72) Inventors: Tiberiu Suto, Franklin, NY (US); Shikhar Kwatra, Raleigh, NC (US); Nadiya Kochura, Bolton, MA (US); Hemant Kumar Sivaswamy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/924,804

(22) Filed: Jul. 9, 2020

(51) Int. Cl.

| | | |
|---|---|---|
| *G06F 15/16* | (2006.01) | |
| *G06F 9/54* | (2006.01) | |
| *H04L 29/06* | (2006.01) | |
| *H04L 29/08* | (2006.01) | |
| *H04L 12/26* | (2006.01) | |
| *G06Q 20/36* | (2012.01) | |

(Continued)

(52) U.S. Cl.
CPC ........... *H04L 67/141* (2013.01); *G06N 20/00* (2019.01); *G06Q 20/36* (2013.01); *H04L 43/10* (2013.01); *H04L 47/72* (2013.01); *H04L 67/18* (2013.01)

(58) Field of Classification Search
CPC ....... H04L 67/141; H04L 43/10; H04L 47/72; H04L 67/18; H06N 20/00; H06Q 20/36
USPC ......................................................... 709/227
See application file for complete search history.

(56) References Cited

U.S. PATENT DOCUMENTS

| 5,784,647 | A | 7/1998 | Sugimoto |
|---|---|---|---|
| 6,907,243 | B1 * | 6/2005 | Patel .................. H04W 72/044 455/442 |
| 9,215,005 | B2 | 12/2015 | Friedl et al. |

(Continued)

FOREIGN PATENT DOCUMENTS

| CN | 105578465 | 5/2016 |
|---|---|---|
| CN | 106102059 | 11/2016 |

(Continued)

OTHER PUBLICATIONS

Anonymous, "Emergency Preparedness/Response Plan 2018/2019", Indiana State University, Aug. 29, 2018, 67 pages.

(Continued)

*Primary Examiner* — Hamza N Algibhah
(74) *Attorney, Agent, or Firm* — Erik Swanson; Andrew D. Wright; Roberts Calderon Safran & Cole, P.C.

(57) ABSTRACT

A computer-implemented method includes: establishing, by a computer device, a threshold for tethering between devices; collecting, by the computer device, network bandwidth usage data and polling data from the devices; training, by the computer device, a machine learning model in view of the collected network bandwidth usage data for predicting a zone of network interruption; determining, by the computer device, locations of the devices; determining, by the computer device, the devices are traveling towards the zone of network interruption; proactively polling, by the computer device, at least one device of the devices for providing pass-through network bandwidth sharing to a first device of the devices; and tethering, by the computer device, the first device to a second device of the devices such that the first device receives the pass-through network bandwidth sharing from the second device.

20 Claims, 7 Drawing Sheets

(51) Int. Cl.
*H04L 12/911* (2013.01)
*G06N 20/00* (2019.01)

(56) References Cited

U.S. PATENT DOCUMENTS

| | | | |
|---|---|---|---|
| 10,237,773 B2 | 3/2019 | Raleigh et al. | |
| 10,262,321 B1* | 4/2019 | Ramanathan | G06Q 20/3829 |
| 10,326,675 B2 | 6/2019 | Raleigh et al. | |
| 10,616,347 B1* | 4/2020 | Van Oort | H04L 45/70 |
| 2005/0026618 A1* | 2/2005 | Gehlot | H04W 36/32 |
| | | | 455/440 |
| 2005/0063330 A1* | 3/2005 | Lee | H04W 72/0413 |
| | | | 370/328 |
| 2008/0151817 A1* | 6/2008 | Fitchett | H04W 28/20 |
| | | | 370/329 |
| 2011/0312312 A1* | 12/2011 | Astrom | G01S 5/0263 |
| | | | 455/418 |
| 2013/0238807 A1* | 9/2013 | Wakikawa | H04W 48/18 |
| | | | 709/227 |
| 2014/0092864 A1* | 4/2014 | Miller | H04W 36/023 |
| | | | 370/331 |
| 2015/0249512 A1* | 9/2015 | Adimatyam | G06F 11/2038 |
| | | | 725/107 |
| 2016/0044129 A1* | 2/2016 | Bergmann | H04L 67/2847 |
| | | | 455/406 |
| 2016/0073271 A1* | 3/2016 | Schultz | H04W 4/90 |
| | | | 455/404.1 |
| 2016/0191913 A1* | 6/2016 | Martch | H04N 21/2402 |
| | | | 348/189 |
| 2016/0295622 A1* | 10/2016 | Huang | H04W 88/04 |
| 2017/0195847 A1 | 7/2017 | Reed et al. | |
| 2018/0063754 A1* | 3/2018 | Wang | H04W 36/0079 |
| 2019/0156326 A1* | 5/2019 | Todasco | H04W 4/80 |
| 2019/0204101 A1* | 7/2019 | Macrae | G01C 21/3492 |
| 2020/0045687 A1* | 2/2020 | Lee | H04W 4/48 |
| 2020/0120108 A1* | 4/2020 | Jain | H04L 67/10 |
| 2020/0213400 A1* | 7/2020 | Van Oort | H04L 69/40 |
| 2020/0274789 A1* | 8/2020 | Lyon | H04L 43/08 |
| 2020/0383012 A1* | 12/2020 | Tseng | H04L 67/02 |
| 2021/0113921 A1* | 4/2021 | Musbah | A63F 13/35 |

FOREIGN PATENT DOCUMENTS

| | | | |
|---|---|---|---|
| CN | 107347195 | 11/2017 | |
| EP | 1598998 A1 * | 11/2005 | H04L 45/16 |
| WO | 2018040621 | 3/2018 | |

OTHER PUBLICATIONS

Anonymous, "All-Hazards Comprehensive Emergency Management Plan" Pasco County Florida, 2014, 501 pages.
Anonymous, "Method and System for Notifying Service providers for Optimizing Network Bandwidth Availability During Peak-Time/Emergency", ip.com, May 11, 2018, 3 pages.
Anonymous, "Dynamic Communications and Artificial Intelligence assessment framework for Disaster Response", ip.com, Oct. 11, 2019, 3 pages.
Anonymous, "Proactive Emergency Detection and Notification through Contextual Analysis of Mobile Phone Network", ip.com, Sep. 28, 2015, 3 pages.
Mell et al., "The NIST Definition of Cloud Computing", NIST, Special Publication 800-145, Sep. 2011, 7 pages.

* cited by examiner

NETWORK BANDWIDTH SHARING

BACKGROUND

Aspects of the present invention relate generally to network bandwidth availability and, more particularly, to network bandwidth sharing systems and processes.

Communications rely on networks for carrying out their operation. It is a common occurrence to experience areas of different levels of network coverage, for example, when traveling.

SUMMARY

In a first aspect of the invention, there is a computer-implemented method including: establishing, by a computer device, a threshold for tethering between devices; collecting, by the computer device, network bandwidth usage data and polling data from the devices; training, by the computer device, a machine learning model in view of the collected network bandwidth usage data for predicting a zone of network interruption; determining, by the computer device, locations of the devices; determining, by the computer device, the devices are traveling towards the zone of network interruption; proactively polling, by the computer device, at least one device of the devices for providing pass-through network bandwidth sharing to a first device of the devices; and tethering, by the computer device, the first device to a second device of the devices such that the first device receives the pass-through network bandwidth sharing from the second device.

In another aspect of the invention, there is a computer program product including one or more computer readable storage media having program instructions collectively stored on the one or more computer readable storage media. The program instructions are executable to: establish at least one threshold for tethering between devices; collect network bandwidth usage data and polling data from the devices; train a machine learning model in view of the collected network bandwidth usage data and the polling data; predict a zone of network interruption for a first device of the devices; determine a location of the devices; proactively poll the at least one device of the devices for pass-through network bandwidth sharing in response to the first device traveling towards the zone of network interruption; and automatically tether the first device to a second device in view of the at least one threshold being met for the pass-through network bandwidth sharing for the first device.

In another aspect of the invention, there is system including a processor, a computer readable memory, one or more computer readable storage media, and program instructions collectively stored on the one or more computer readable storage media. The program instructions are executable to: establish thresholds for tethering between devices; collect network bandwidth data and polling data from the devices; train a machine learning model in view of the collected network bandwidth data and the polling data; predict a zone of network interruption for a first device of the devices; locate the devices along a path; proactively poll at least one device of the devices along the path for pass-through network bandwidth sharing; and automatically tether the first device to a second device in response to the thresholds being met for the pass-through network bandwidth sharing for the first device.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to bandwidth availability and, more particularly, to bandwidth sharing systems and processes. In embodiments, a network bandwidth sharing system determines bandwidth needs for a user. In view of these bandwidth needs, the network bandwidth sharing system proactively polls trusted devices in a vicinity of the user which have bandwidth availability. In this way, prior to a network interruption, the network bandwidth sharing system connects to the trusted device for avoiding network interruptions. Accordingly, systems and processes described herein allow for avoiding communication interruptions for a user due to network issues.

During a call, a user uses a network of their service provider to participate in the call. Generally, systems detect zones where the system may lose cellular data network, which leads to interruption in the network and the call. Accordingly, the user experiences communication issues. In order to execute a seamless call, the user might connect to an alternate network, such as a Wi-Fi network in the vicinity, so that there the user does not face network issues.

Implementations of the invention allow for improvements to a functioning of a computer device by preventing interruption of computer-based communications caused by network interruptions. In embodiments, the systems and processes described herein provide this prevention by collecting and processing network bandwidth usage data for a plurality of trusted devices, including a history of monitored network non-dead and dead zones for all of the devices. In view of this network bandwidth usage data, the systems and processes described herein proactively poll and tether to a trusted device out of the plurality of trusted devices for sharing network bandwidth prior to network interruption. In this way, a user is able to use their device without interruption. Accordingly, providing pass-through network bandwidth sharing prior to network interruption improves a functioning of a computer device by preventing device interruption.

Implementations of the invention also allow for a practical application by allowing device use without interrupting a user. In embodiments, the systems and processes described herein prevent interruption by determining and predicting bandwidth needs and network non-dead and dead zones. In view of the bandwidth needs and the network non-dead and dead zones, the systems and processes described herein proactively poll trusted devices for providing pass-through network bandwidth sharing. In this way, the present disclosure provides the practical application of device use without device interruption. Accordingly, users continue using their devices, even in view of network interruptions.

In addition, the steps for providing pass-through network bandwidth sharing are unconventional. In embodiments, prior to a device encountering a network interruption, the systems and processes described herein implement steps for: a) establishing a trust relationship between a plurality of devices; b) establishing thresholds for automatic tethering between the trusted devices; c) collecting network bandwidth usage data from the trusted devices; d) generate a machine learning model in view of the collected data for determining periods of network interruption; e) locating the trusted devices; f) identifying zones of network interruption; g) predicting zones of network interruption; h) proactively polling the trusted devices for pass-through network bandwidth sharing prior to network interruption; and i) providing pass-through network bandwidth sharing to avoid network interruption. In view of this arrangement of steps, the systems and processes allow for a use of devices without interruption, even if the network is interrupted.

It should be understood that, to the extent implementations of the invention collect, store, or employ personal information provided by, or obtained from, individuals (for example, device usage data), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
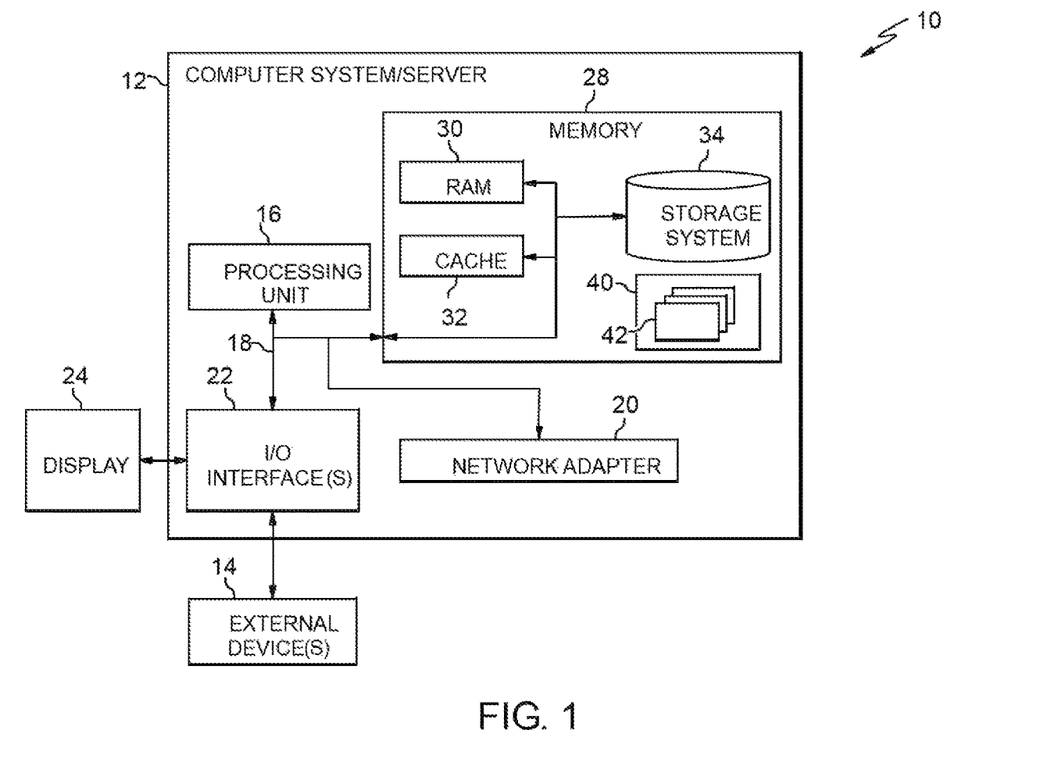
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
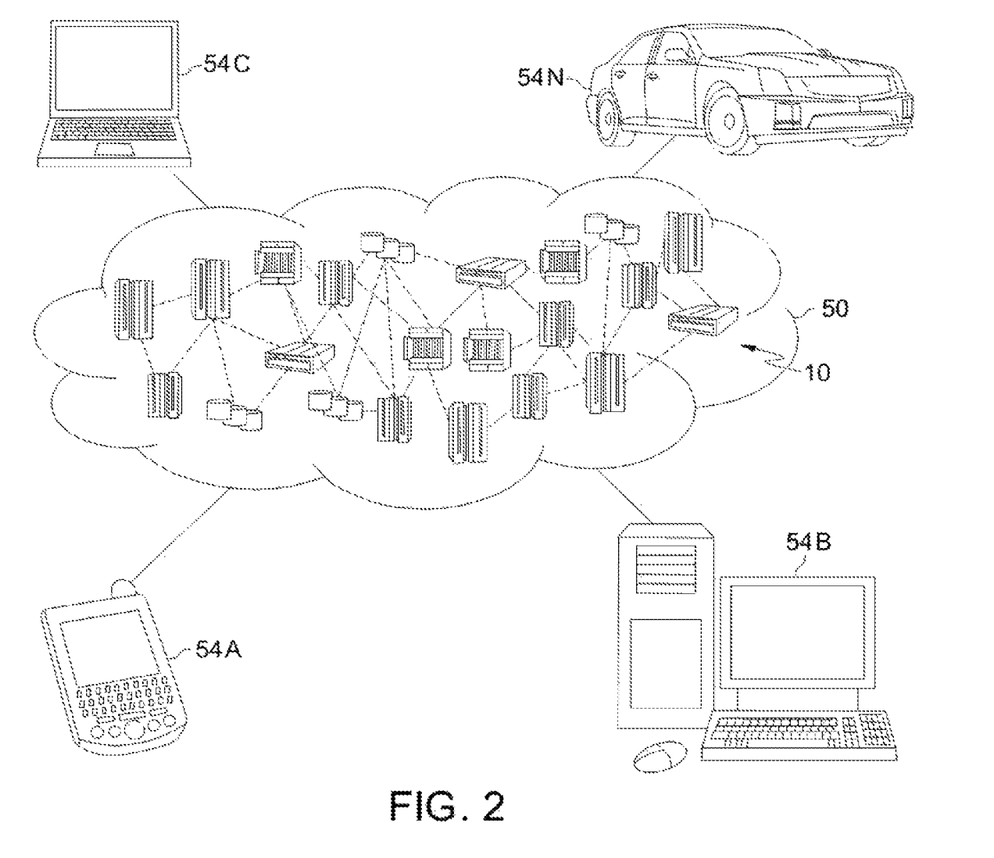
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
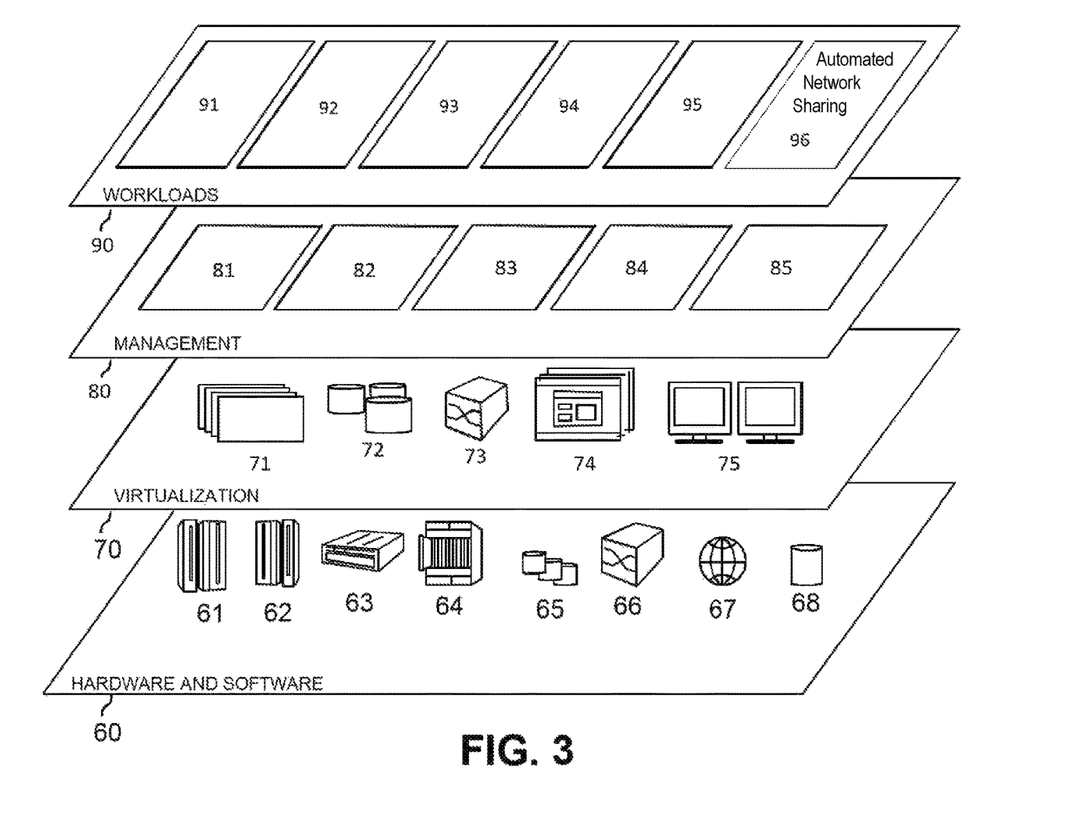
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated network sharing 96.

Implementations of the invention may include a computer system/server 12 of FIG. 1 in which one or more of the program modules 42 are configured to perform (or cause the computer system/server 12 to perform) one or more functions for the automated network sharing 96 of FIG. 3. For example, the one or more of the program modules 42 may be configured to: establish a trust relationship between a plurality of devices; establish thresholds for automatic tethering between the trusted devices; collect network bandwidth usage data from the trusted devices; generate a machine learning model in view of the collected data for determining periods of network interruption; locate the trusted devices; identify zones of network interruption; predict zones of network interruption; proactively poll the trusted devices for pass-through network bandwidth sharing prior to network interruption; and provide pass-through network bandwidth sharing to avoid network interruption.

Figure 4:
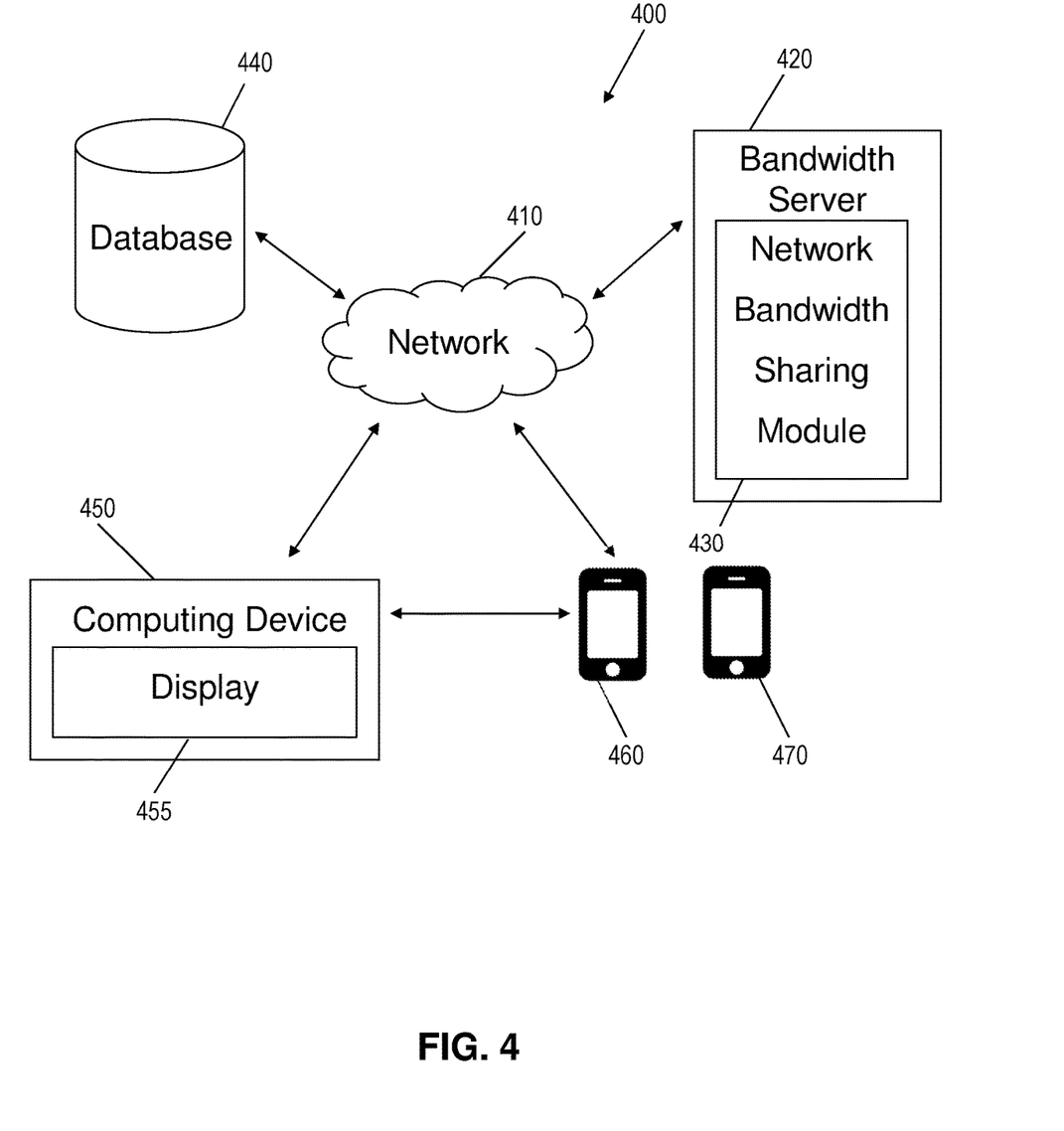
FIG. 4 shows a block diagram of an exemplary environment in accordance with aspects of the invention.

FIG. 4 shows a block diagram of an exemplary environment 400. In embodiments, the environment 400 includes a network 410, a bandwidth server 420, a database 440, a device 450, a device 460, and a device 470. The bandwidth server 420 comprises a network bandwidth sharing module 430, which comprises one or more program modules such as program modules 42 described with respect to FIG. 1. In embodiments, the bandwidth server 420 includes additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

The network 410 is any suitable combination of communication networks and may comprise, for example, one or more of a LAN, WAN, and the Internet. In one embodiment, the network 410 is representative of a cloud computing environment 50 as described in FIG. 2. The devices 450, 460, 470 are computer devices and include one or more components of the computer system 12 of FIG. 1. In embodiments, the devices 450, 460, 470 include smartphones, laptop and desktop computers, smart watches, tablets, etc., i.e., devices using network bandwidth from a network service provider. For example, a user may utilize the device 450 for a call through the network of their network service provider.

In embodiments, users of the devices 450, 460, 470 establish a chain of trust for forming a trust relationship between the devices 450, 460, 470 for providing pass-through network bandwidth sharing. In embodiments, the users of the devices 450, 460, 470 establish the trust relationship by pairing or bonding the devices 450, 460, 470 with one another. In another example, the users establish the trust relationship between the devices 450, 460, 470 through a trust handshake. In an example of a trust handshake, devices 450, 460, 470 initiate communications by sending and accepting invites to one another to join the trust cohort. The devices 450, 460, 470 then send several messages between each other for establishing the trust relationship. In some embodiments, in response to establishing the trust relationship, the trusted devices are visible in a display 455 of the device 450.

In embodiments, automatic tethering includes the network bandwidth sharing module 430 connecting device 450 to another device of the devices 460, 470 for pass-through network bandwidth sharing in view of a threshold being met. In embodiments, the network bandwidth sharing module 430 connects device 450 to the other device and uses the other device as a router (hotspot) for accessing the network bandwidth of the other device. In an example of tethering, the network bandwidth sharing module 430 wirelessly connects device 450 to the device 460, thereby allowing device 450 use of the network bandwidth from the network service provider of the device 460. In this way, the network bandwidth sharing module 430 avoids network interruption to the user of the device 450 by tethering device 450 to the device 460 and accessing the network bandwidth from the network service provider of the device 460 through this connection.

In embodiments, the threshold for automatic tethering between the devices 450, 460, 470 is in view of device characteristics of the devices 450, 460. In one example, the threshold is with respect to signal strength for both a device 450 requesting the pass-through network bandwidth sharing and the devices 460, 470 providing pass-through network bandwidth sharing. In embodiments, a user manually sets the threshold. Alternatively, the threshold is dynamic, with the network bandwidth sharing module 430 adjusting the threshold automatically in view of network bandwidth usage data. In this way, the network bandwidth sharing module 430 proactively polls devices 460, 470 in real time.

In embodiments, the network bandwidth sharing module 430 proactively polls the devices 460, 470 for determining which device of the devices 460, 470 provides a desirable router for pass-through network bandwidth sharing for the user of the device 450. In embodiments, the proactive polling includes the network bandwidth sharing module 430 connecting to the devices 460, 470 and determining which device of the devices 460, 470 provides desirable network bandwidth features for the user of the device 450. In this way, polling determines which device of the devices 460, 470 the network bandwidth sharing module 430 should automatically tether the device 450 to for receiving the pass-through network bandwidth sharing. Further, proactive polling allows for the user of device 450 to avoid network interruption before encountering the network interruption.

In embodiments, the network bandwidth sharing module 430 proactively polls the devices 460, 470 with respect to device characteristics. In embodiments, device characteristics include signal strength of the devices 460, 470, a distance of the devices 460, 470 with respect to the requesting device 450, network bandwidth availability from the network service providers of the devices 460, 470, and/or battery power of the devices 460, 470, amongst other examples. In an example of proactively polling in view of signal strength, the device 460 has a signal strength higher than the device 470. Accordingly, the network bandwidth sharing module 430 proactively polls the device 460 before polling device 470 in view of signal strength. In this way, the network bandwidth sharing module 430 allows for a determination of which device out of a plurality of mobile devices 460, 470, which possibly use different providers, has a strongest signal strength and proactively polls the device with the strongest signal strength for pass-through network bandwidth sharing to handle network tasks seamlessly.

In an example of proactive polling in view of a distance, the network bandwidth sharing module 430 polls the trusted devices 460, 470 for tethering with respect to the trusted devices 460, 470 being within a vicinity of the device 450, in addition to or instead of the signal strength. In embodiments, a vicinity is a distance which allows for communication between the device 450 and the trusted devices 460, 470. In an example, the devices 450, 460 in a vehicle are within a closer vicinity than the device 470 in another vehicle. Accordingly, the network bandwidth sharing module 430 proactively polls the device 460 before polling the device 470 in view of the device 460 being in a closer vicinity with respect to the device 450.

In an example of proactive polling in view of network bandwidth availability, the network bandwidth sharing module 430 polls the trusted devices 460, 470 for tethering with respect to network bandwidth availability from the network service providers of the devices 460, 470, in addition to or instead of signal strength and/or distance. In embodiments, the network bandwidth availability includes a size of data availability. For example, the device 460 has a larger data plan providing a larger amount of data than the data plan of the device 470. Accordingly, the network bandwidth sharing module 430 proactively polls the device 460 before polling the device 470 in view of the device 460 having a greater amount of data available compared to the device 470.

In an example of proactive polling in view of battery power, the network bandwidth sharing module 430 polls the trusted devices 460, 470 for tethering with respect to a battery power level of the trusted devices 460, 470, in addition to or instead of signal strength, distance, and/or network bandwidth availability. In embodiments, battery power includes an amount of power available for the devices 460, 470. For example, the device 460 has a battery power level greater than the battery level of the device 470. Accordingly, the network bandwidth sharing module 430 proactively polls the device 460 before polling the device 470 in view of the battery power of the devices 460, 470.

In embodiments, the network bandwidth sharing module 430 of the scheduling server 420 collects network bandwidth usage data of the devices 450, 460, 470 directly from the devices 450, 460, 470 through the network 410 over a period of time. In embodiments, the network bandwidth usage data includes tethering data, Global Positioning System (GPS) data, and signal strength data directly from the devices 450, 460, 470.

In embodiments, the network bandwidth sharing module 430 identifies network dead zones and non-dead zones. In one example, the network bandwidth usage data indicates that at certain GPS coordinates, the device 450 experiences only a lowest number of bars for network connectivity. In this way, the network bandwidth sharing module 430 identifies a network dead zone, i.e., network interruptions for the device 450, in view of the device 450 experiencing the lowest number of bars for network connectivity in this area. Alternatively, the network bandwidth usage data indicates that at certain GPS coordinates, the device 450 experiences a full five bars out of five bars for signal strength for the device 450. Accordingly, the network bandwidth sharing module 430 identifies a network non-dead zone, i.e., no network interruptions, in view of the device 450 experiencing the full number of bars for network connectivity in this area. In this way, an area where the device 450 has a relatively high signal strength indicates a network non-dead zone, while an area having a relatively low signal strength indicates a network dead zone. Accordingly, the network bandwidth usage data allows for the identification of the network non-dead and dead zones by the network bandwidth sharing module 430. In further embodiments, the network bandwidth usage data indicates that at certain GPS coordinates, the device 450 experiences a signal degradation in real time. For example, signal degradation includes a signal strength of the device 450 dropping from a maximum number of bars representing signal strength to less than a maximum number of bars. As a specific example, the device 450 experiences signal degradation when the signal strength goes from five signal bars to four signal bars, which affects the network connectivity with respect to the device 450.

In embodiments, the network bandwidth sharing module 430 implements a machine learning model having an incentivization schema strategy and a decision layer which predicts a network interruption and determines which device out of the devices 460, 470 to proactively poll in view of the predicted network interruption. In embodiments, the network bandwidth sharing module 430 trains the machine learning model in view of the collected network bandwidth usage data of the devices 450, 460, 470 in view of the network non-dead and dead zones. In one example, the collected network bandwidth usage data indicates that at certain GPS coordinates, the bandwidth sharing module 430 proactively polls the devices 460, 470 for tethering on behalf of the device 450 because of a network dead zone. In further embodiments, the collected network bandwidth usage data indicates that at certain GPS coordinates, the bandwidth sharing module 430 proactively polls the devices 460, 470 for tethering on behalf of the device 450 in view of an area of signal degradation. In view of this collected network bandwidth usage data, the machine learning model learns that the network bandwidth sharing module 430 proactively polls the devices 460, 470 and tethers to one of the devices 460, 470 for pass-through network bandwidth sharing in response to approaching the GPS coordinates. Accordingly, the machine learning model predicts a network interruption for the device 450 in view of the device 450 traveling towards the GPS coordinates of the network dead zone or in view of the device 450 traveling towards the GPS coordinates of an area of signal degradation where the device 450 experiences signal degradation.

In embodiments, the network bandwidth sharing module 430 stores the collected network bandwidth usage data and the data analytics of tethering within the database 440 for access by the network bandwidth sharing module 430 for application to the machine learning model. Accordingly, the network bandwidth sharing module 430 accesses the collected network bandwidth usage data and trains the machine learning model in view of the collected network bandwidth usage data for determining when to poll the trusted devices 460, 470 within the vicinity of the device 450. In this way, the machine learning does not need to relearn and/or reanalyze this area since the data analytics for this area are available from the database 440.

In embodiments, training of the machine learning model includes applying information regarding the network service providers of the devices 460, 470 and user identifiers (IDs) of the respective users of the devices 460, 470 obtained from the collected network bandwidth usage data. In embodiments, the network bandwidth sharing module 430 designates the network service providers as a first feature vector, with the vector=[network service provider 1, network service provider 2, network service provider 3, network service provider 4]. In this way, the network bandwidth sharing module 430 standardizes the network service providers into a digital representation.

In embodiments, standardizing the network service providers is done as one-hot encoding into an input feature vector by the network bandwidth sharing module 430. In one example, the network bandwidth sharing module 430 represents a first network service provider in a matrix form, e.g., [0 1 0 0], with the user ID (U_ID) affixed to the encoded network to indicate a specific user with the following user ID uses this network service provider. In embodiments, the user ID is a numerical value which represents a user of one of the devices 450, 460, 470. In this way, a user has multiple devices but has a single user ID for all the devices.

In embodiments, when the user of the device 450 is traveling with the device 450, the network bandwidth sharing module 430 represents a network zone for each network service provider as a second feature vector. In one example, the feature vector for the network zone includes latitude and longitude features or a geofence (G) feature of an area which indicates an area that the network service provider covers along the path the user of the device 450 is traveling. In this way, the network bandwidth sharing module 430 proactively takes into account geofence areas of the network zone for providing pass-through network bandwidth sharing when the user is traveling.

In embodiments, in view of the user's existing bandwidth needs, the machine learning model learns about different network zones and different areas from available network service providers as the user is traveling. In one example, the machine learning model learns alternate networks owned by a user's friends/colleagues. As a result, the network bandwidth sharing module 430 establishes dynamic networking as a multi-hop connectivity between subzone nodes within a geo-location perimeter and timespan. Accordingly, the systems and processes described herein implement the decision layer to decide which devices to poll and at what time in view of the identified network bandwidth needs and network dead zones.

In embodiments, the network bandwidth sharing module 430 locates the devices 450, 460, 470 for providing pass-through network bandwidth sharing prior to network interruption for the device 450. In one example, the network bandwidth sharing module 430 retrieves data from the user's calendar to determine a location of the user of the device 450. In a further example, the network bandwidth sharing module 430 also accesses the calendars of the users of the devices 460, 470 to determine locations of the devices 460, 470 and to determine whether the users of the devices 460, 470 are traveling along with the user of the device 450. In this way, the network bandwidth sharing module 430 fetches information about other networks available within a vicinity by fetching information from the user's calendar to keep track of users and their respective devices 460, 470 which will be available during travel. In embodiments, in addition to or instead of accessing the digital calendars, the network bandwidth sharing module 430 obtains the location of the devices 450, 460, 470 directly from the devices. In one example, the network bandwidth sharing module 430 accesses GPS data directly from the devices 450, 460, 470.

In embodiments, in view of the locations of the users of the devices 450, 460, 470 and the training of the machine learning model, the decision layer determines when to proactively poll the devices 460, 470 for tethering for providing pass-through network bandwidth sharing to device 450. In one example, the network bandwidth sharing module 430 represents a feature vector for the network zone as [lat,lon] and is encoded as another row in the vectorized form as a numerical feature set for the decision layer. In this way, the network bandwidth sharing module 430 tracks the location of the device 450 by latitude and longitude and/or geofence areas, and provides the location of the device 450 into the machine learning model so that the decision layer decides when to proactively poll the devices 460, 470 in view of the historical polling and tethering data. Accordingly, the network bandwidth sharing module 430 takes into account the network conditions changing with respect to the location of the user traveling with the device 450.

In embodiments, a data frame (X) in the database 440 contains various parameters which the decision layer analyzes to decide when to proactively poll devices 460, 470. In one example, the network bandwidth sharing module 430 represents the data frame (X)=[current service provider network, U_ID, network zone, coverage, bandwidth, time]. In embodiments, the coverage vector represents a network coverage/data network availability value or signal strength variation value for that specific network zone. In this way, as a location of the user is varying, the data frame (X) is also varying because the geofence value various over a time (T). In another example, the signal strength value also keeps varying in response to the user location varying, with recording of the varying signal strength values over time intervals.

In embodiments, a data frame (Y) in the database 440 contains various feature vectors which the decision layer also analyzes to decide when to proactively poll devices 460, 470. In one example, the data frame (Y) contains the following feature vectors: Y=[network comparison, existing networks]. In one example, the network comparison vector is a chart of varying signal data based on polling existing networks within a vicinity of the user, e.g., network service provider 1 vs network service provider 2 vs network service provider 3 vs network service provider 4 within the vicinity.

In embodiments, the decision layer of the machine learning model includes a classifier, e.g., a multi-level classifier/SVM classifier, which processes the network bandwidth usage data and the historical polling and tethering data by classifying the data in view of the network service providers. In one example, the network bandwidth sharing module 430 trains the classifier to pick one of the existing networks within the vicinity [network service provider 1, network service provider 2, network service provider 3, network service provider 4] as mentioned in an output Y[,1:] of the Y data frame. In this way, the classifying of the multilevel classifier occurs at runtime for establishing multi-hop networking between trusted devices within a vicinity of a device desiring network bandwidth.

In embodiments, the network bandwidth sharing module 430 infuses the decision layer of the machine learning model with a reinforcement learning model. In one example, the network bandwidth sharing module 430 feeds the Y data frame into the reinforcement learning model, with a counter value as a state parameter in conjunction with a critically enabled dynamic network provider in a given environment (E). In embodiments, the parameters of {S,A,T,R} of the reinforcement learning model represent a state (S), a software agent (A) monitoring the control transfer, a transition (T) to a new state based on Q learning, and a reward function (R) generated based on hotspot provision. In one example, agent A monitors the transition T, and the reward R updates for a provider at a time (t), while the counter value updates by 1. The exemplary function (1) is illustrated below.

```
Count = Collections. counter( )                    (1)
If (network_provision ==True)
  S : Y
  R = +x
  For I, chx in Y:
    Count[chx] ++;
      Return I, chx
  Else
    #Do nothing
```

In this way, the network bandwidth sharing module 430 rewards the user for providing pass-through network bandwidth sharing by assigning a positive reward to the user for providing pass-through network bandwidth sharing. Accordingly, the machine learning model with reinforced learning allows for devices to form a Bluetooth scatter net model with a counter enabled incentivization strategy. In this way, the network bandwidth sharing module 430 reinforces the machine learning model in view of the network bandwidth data and the polling and tethering data.

In embodiments, the network bandwidth sharing module 430 generates a heat map indicating geofences (G) where the device 450 receives the pass-through network bandwidth sharing. In one example, a hot spot is over an area covered by the geofence where the device 450 received pass-through network bandwidth sharing. In embodiments, the network bandwidth sharing module 430 updates the heatmap as the device 450 receives pass-through network bandwidth service sharing. In one example, the network bandwidth sharing module 430 considers the heatmap as part of the environment (E) variable, where the network bandwidth sharing module 430 updates counter value as part of the given environment (E) for future referencing by the machine learning model.

In embodiments, the incentivization strategy for providing pass-through network bandwidth sharing considers optimal usage of devices 460, 470 to minimize an impact on the user providing the pass-through network bandwidth sharing. In one example, the network bandwidth sharing module 430 uses several factors in calculating incentive rewards. These factors include: 1) projected overages of a data plan based on a typical usage of a primary user; and 2) an impact on a battery of a device which provides network bandwidth tethering, wherein the impact on the battery includes a determination of power required for providing network bandwidth compared to a battery level. In embodiments, as these factors change over a course of a tethering session, the pricing dynamically updates.

Figure 5:
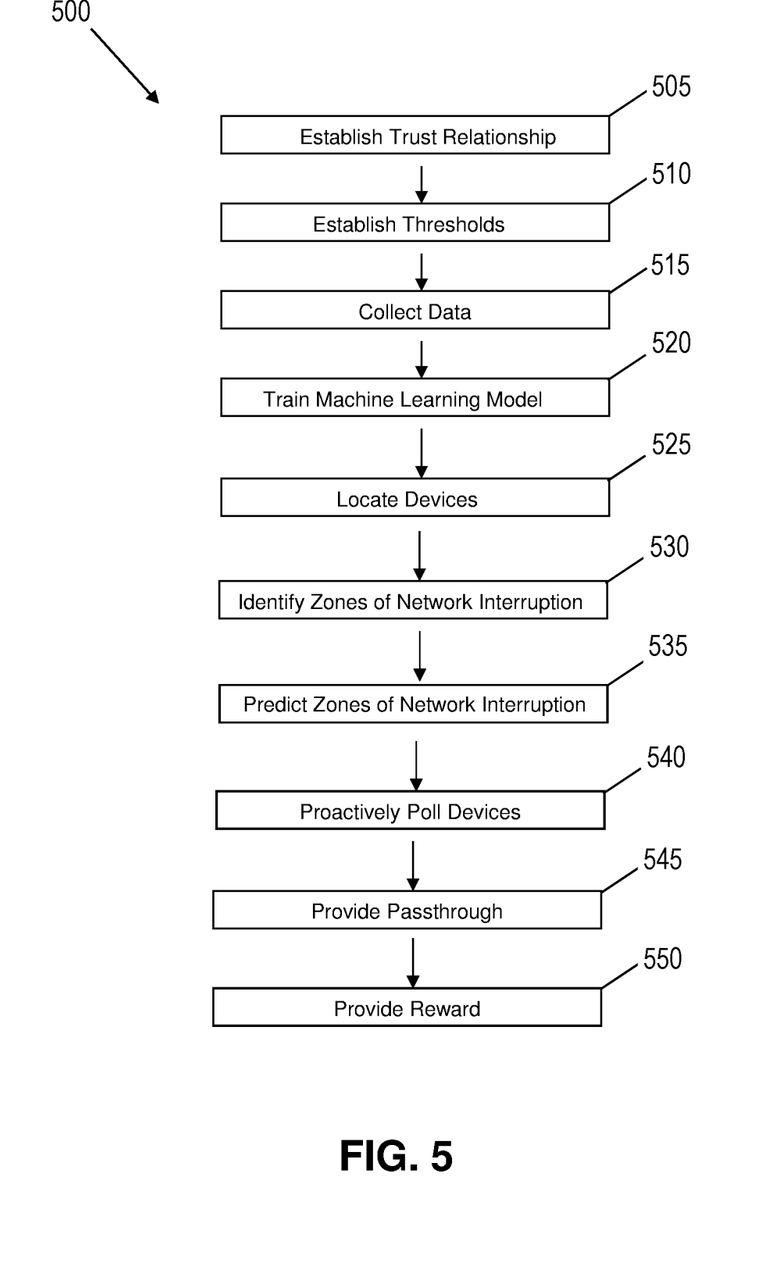
FIG. 5 shows a flowchart of an exemplary method in accordance with aspects of the invention.

FIG. 5 shows a flowchart 500 of an exemplary method in accordance with aspects of the invention. Steps of the method may be carried out in the environment of FIG. 4 and are described with reference to elements depicted in FIG. 4.

At step 505, users of the devices 450, 460, 470 establish a trust relationship between the devices 450, 460, 470. In embodiments, and as described with respect to FIG. 4, this includes the users performing a trust handshake between the devices 450, 460, 470.

At step 510, the system establishes pre-configured thresholds for automatic tethering. In embodiments, and as described with respect to FIG. 4, this includes the network bandwidth sharing module 430 adjusting the pre-configured threshold automatically in view of network bandwidth usage data.

At step 515, the network bandwidth sharing module 430 collects network bandwidth usage data with respect to the devices 450, 460, 470. In embodiments and as described with respect to FIG. 4, this includes the network bandwidth sharing module 430 collecting network bandwidth usage data and polling and tethering data directly from the devices 450, 460, 470 through the network 410 over a period of time.

At step 520, the network bandwidth sharing module 430 trains a machine learning model within the network bandwidth sharing module 430 using the collected network bandwidth usage data (e.g., collected at step 515). In embodiments and as described with respect to FIG. 4, this includes the network bandwidth sharing module 430 accessing the collected network bandwidth usage data from the database 440 and applying the collected network bandwidth usage data to the machine learning model. Accordingly, the network bandwidth sharing module 430 accesses the collected network bandwidth usage data and trains the machine learning model using the collected network bandwidth usage data for determining when to poll the trusted devices 460, 470 within the vicinity of the device 450.

At step 525, the network bandwidth sharing module 430 locates the devices 450, 460, 470. In embodiments and as described with respect to FIG. 4, this includes the network bandwidth sharing module 430 locating the devices 450, 460, 470 by accessing calendars of the users of the devices 450, 460, 470. In further embodiments, the network bandwidth sharing module 430 accesses location data directly from the devices 450, 460, 470.

At step 530, the network bandwidth sharing module 430 identifies zones of network interruption for the device 450. In embodiments and as described with respect to FIG. 4, this includes the network bandwidth sharing module 430 identifying network dead zones in view of the device 450 experiencing the lowest number of bars for network connectivity in an area of certain GPS coordinates. In further embodiments and as described with respect to FIG. 4, step 530 includes the network bandwidth sharing module 430 identifying areas where the device 450 experiences signal degradation.

At step 535, the network bandwidth sharing module 430 predicts a zone of network interruption for the device 450. In embodiments and as described with respect to FIG. 4, this includes the network bandwidth sharing module 430 predicting the zone of network interruption in view of the collected network bandwidth usage data and determines that the device 450 is traveling towards the zone of network interruption. In embodiments, the system makes the prediction at step 535 based on the current location of the device 450, the predicted location of the device 450, and through the machine learning model. In further embodiments and as described with respect to FIG. 4, the network bandwidth sharing module 430 predicts an area of signal degradation in view of the collected network bandwidth usage data and determines that the device 450 is traveling towards the area of signal degradation.

At step 540, the network bandwidth sharing module 430 proactively polls the devices 460, 470 for pass-through network bandwidth sharing. In embodiments and as described with respect to FIG. 4, this includes the network bandwidth sharing module 430 proactively polling the devices in view of their device characteristics in response to the network bandwidth sharing module 430 determining that the device 450 is traveling towards the zone of network interruption.

At step 545, the network bandwidth sharing module 430 provides pass-through network bandwidth sharing to the device 450. In embodiments and as described with respect to FIG. 4, this includes the network bandwidth sharing module 430 tethering the device 450 to one of the devices 460, 470 in view of the proactive polling of step 540. In this way, the network bandwidth sharing module 430 tethers the device 450 for receiving the pass-through network bandwidth sharing so that the device 450 avoids network interruption.

At step 550, the network bandwidth sharing module 430 provides a reward. In embodiments and as described with respect to FIG. 4, this includes the network bandwidth sharing module 430 updating a balance in a digital wallet of a user who provides pass-through network bandwidth sharing through their device to the device 450. In one example, the reward is with respect to network bandwidth units, e.g., volume of data/time.

Figure 6:
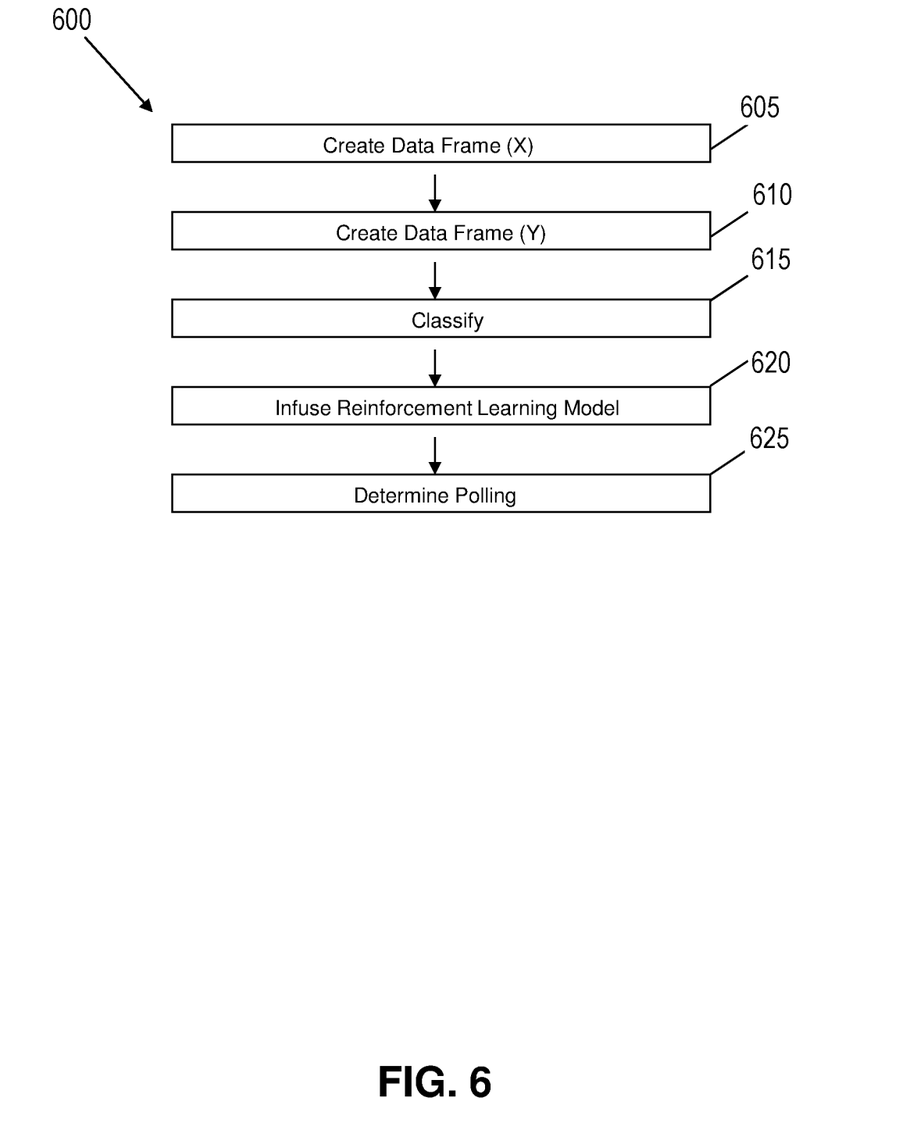
FIG. 6 shows a flowchart of an exemplary decision layer of a machine learning in accordance with aspects of the invention.

FIG. 6 shows a flowchart 600 of an exemplary process performed by the decision layer of the machine learning model described herein. Steps of the method may be carried out in the environment of FIG. 4 and are described with reference to elements depicted in FIG. 4.

At step 605 the network bandwidth sharing module 430 creates a data frame (X) from the network bandwidth usage data. In embodiments and as described with respect to FIG. 4, this includes the network bandwidth sharing module 430 creating the data frame (X) with the following parameters: X=[current service provider network, U_ID, network zone, coverage, bandwidth, time].

At step 610, the network bandwidth sharing module 430 creates a data frame (Y) from the network bandwidth usage data and the historical polling data. In embodiments and as described with respect to FIG. 4, this includes the network bandwidth sharing module 430 creating the data frame (Y) with the following feature vectors: Y=[network comparison, existing networks].

At step 615, the network bandwidth sharing module 430 classifies the network bandwidth usage data and the historical polling data. In embodiments and as described with respect to FIG. 4, this includes the network bandwidth sharing module 430 training the classifier to pick one of the existing networks within the vicinity [network service provider 1, network service provider 2, network service provider 3, network service provider 4] as mentioned in an output Y[,1:] of the Y data frame.

At step 620, the network bandwidth sharing module 430 infuses the decision layer of the machine learning model with a reinforcement learning model. In embodiments and as described with respect to FIG. 4, this includes the network bandwidth sharing module 430 feeding the Y data frame into the reinforcement learning model, with a counter value as a state parameter in conjunction with a critically enabled dynamic network provider in a given environment (E). In one example, agent A monitors the transition T, and the reward R updates for a provider at a time (t), while the counter value updates by 1.

At step 625, in view of the decision layer, the network bandwidth sharing module 430 determines to poll the devices 460, 470 and automatically tether to one of the devices 460, 470 for providing pass-through network bandwidth sharing. In embodiments and as described with respect to FIG. 4, this includes the network bandwidth sharing module 430 determining users of devices 450, 460 are traveling together in view of the network bandwidth sharing module 430 locating the devices 450, 460, 470 from step 525. In view of the steps 605-625, the machine learning model which of the devices 460, 470 to proactively poll at step 535.

Figure 7:
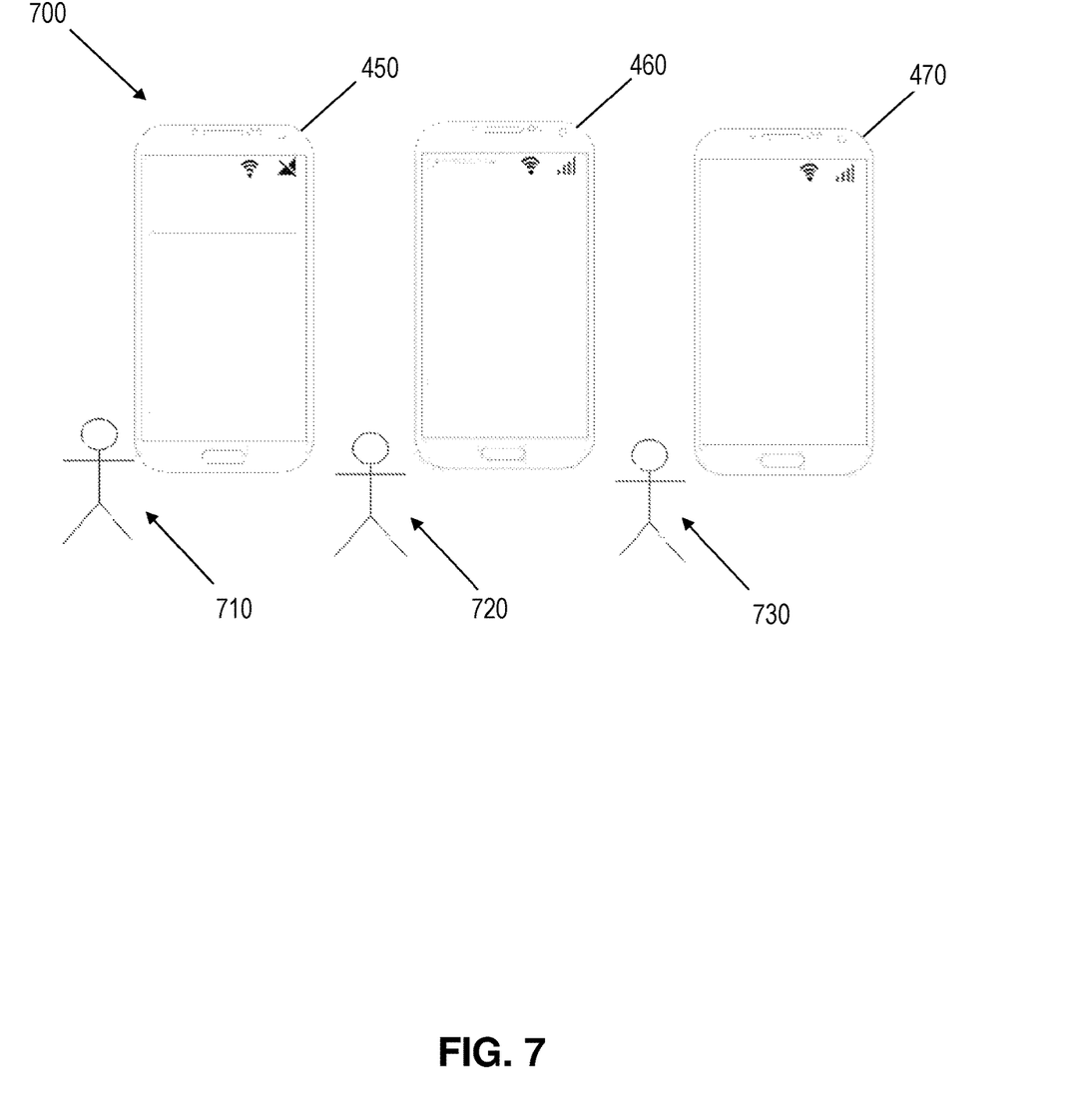
FIG. 7 shows an exemplary scenario for network bandwidth sharing in accordance with aspects of the invention.

FIG. 7 illustrates a use scenario 700 for pass-through network bandwidth sharing with respect to FIG. 4. In embodiments, user 710 has the device 450, while a user 730 has a device 460. In one example, the devices 450, 460 are on different network service providers. In embodiments, the users 710, 730 are at a restaurant for lunch. At the restaurant, the device 460 has five bars for signal strength, while the device 450 has a single bar for signal strength. Since the devices 450, 460 of the users 710, 730 both belong to the trust relationship and therefore are trusted devices with respect to one another, the device 450 has a preconfigured threshold to automatically tether to the device 460 when the device 450 has a signal strength less than two bars. In this example, the user 730 wants to show the user 710 an important email. In view of the trust relationship and the device characteristics of signal strength and the devices 450, 460 being within a vicinity of one another, the network bandwidth sharing module 430 automatically tethers the device 450 to the device 460 so that the email is shown between the users 710, 730 without network interruption.

In another example of providing pass-through network bandwidth sharing, the user of the device 450 has a choice for tethering between a best performance or a lowest cost. In one example, the device 460 subscribes to a network plan of 5 GB of data per month. In this example, the user 720 is halfway through the month and has already used 4 GB of data. In response to the user 720 projecting that they will likely run out of data this month and be throttled or have to purchase an extra data pack, the user 730 sets their device at a higher cost for providing pass-through network bandwidth sharing, e.g., $0.25/MB of data, in view of device 460 having a battery level at 90% and the device 460 getting five bars of signal strength in the area. In this way, the user 720 sets limits to allow data use of up to a specific amount, e.g., $10, to ensure their bill is not increasing beyond their budgeted amount.

In contrast, another user 730 with device 470 has a 10 GB per month plan with their network service provider and has used only 2 GB of data halfway through the month. Accordingly, the user 730 sets the cost of pass-through network bandwidth sharing for the device 470 at a cost lower than the cost for pass-through network bandwidth sharing from the device 460, e.g., at $0.10/MB of data, in view of the device 470 having a battery level at 40% and a signal strength of three bars. In this way, the user 710 is given a choice to choose between best performance or lowest cost for this session. For example, user 710 chooses a lowest cost option and selects a pass-through network bandwidth sharing for $0.10/MB from the device 470. In response to the battery of the device 470 providing pass-through network bandwidth sharing to the device 450 is starting to discharge more as a result of the tethering, and is reaching 30%, the network bandwidth sharing module 430 updates the cost per MB from $0.10/MB to $0.40/MB or even higher for the device 470 if the battery of the device 470 is at risk for running out battery power before a usual charging time. In this event, the network bandwidth sharing module 430 switches tethering of the device 450 from the device 470 to tethering to the device 460 of user 720 automatically in view of the lower cost for providing pass-through network bandwidth sharing from the device 460.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    establishing, by a computer device, a threshold for tethering between devices;
    collecting, by the computer device, network bandwidth usage data and polling data from the devices;
    training, by the computer device, a machine learning model in view of the collected network bandwidth usage data for predicting a zone of network interruption;
    determining, by the computer device, locations of the devices;
    determining, by the computer device, the devices are traveling towards the zone of network interruption;
    proactively polling, by the computer device, at least one device of the devices for providing pass-through network bandwidth sharing to a first device of the devices; and
    tethering, by the computer device, the first device to a second device of the devices such that the first device receives the pass-through network bandwidth sharing from the second device, wherein the training the machine learning model includes analyzing a data frame having a network comparison vector and an existing networks vector, wherein the network comparison vector is a chart of varying signal data based on the computer device polling existing networks within a vicinity of a user of the first device.

2. The method of claim 1, wherein the threshold is with respect to signal strength of the devices.

3. The method of claim 1, wherein the determining the locations of the devices includes accessing GPS data from the devices.

4. The method of claim 1, further comprising updating, by the computer device, a digital wallet of a user of the second device for providing the pass-through network bandwidth sharing.

5. The method of claim 4, wherein the proactively polling includes polling the devices in an order in view of device characteristics of the devices.

6. The method of claim 5, wherein the updating the digital wallet includes providing credits to the digital wallet in view of an amount of time.

7. The method of claim 1, wherein the training the machine learning model includes applying to the machine learning model information regarding network service providers of the devices and user identifiers of users of the devices from the collected network bandwidth usage data.

8. The method of claim 1, wherein the training the machine learning model includes creating data frames in view of the collected network bandwidth usage data.

9. The method of claim 8, further comprising infusing, by the computer device, the machine learning model with a reinforcement learning model, wherein the data frame is fed into the reinforcement learning model.

10. The method of claim 9, further comprising:
    displaying, by the computer device, the devices in a display of the first device; and
    fetching, by the computer device, information about other networks available in a vicinity of the first device by fetching information from a calendar of the user of the first device for tracking user identifiers.

11. The method of claim 10, further comprising classifying, by the computer device, the collected network bandwidth usage data for training the machine learning model to pick a network within the vicinity.

12. The method of claim 9, further comprising:
    generating a heat map indicating geofences where the first device receives the pass-through network bandwidth sharing, wherein a hot spot of the heat map is over an area covered by a geofence of the geofences where the first device received the pass-through network bandwidth sharing; and
    updating the heatmap by updating a counter value of an environment variable for future referencing by the machine learning model.

13. A computer program product comprising one or more computer readable storage media having program instructions collectively stored on the one or more computer readable storage media, the program instructions executable to:

establish at least one threshold for tethering between devices;

collect network bandwidth usage data and polling data from the devices;

train a machine learning model in view of the collected network bandwidth usage data and the polling data;

predict a zone of network interruption for a first device of the devices;

determine a location of the devices;

proactively poll the at least one device of the devices for pass-through network bandwidth sharing in response to the first device traveling towards the zone of network interruption; and automatically tether the first device to a second device in view of the at least one threshold being met for the pass-through network bandwidth sharing for the first device, wherein the training the machine learning model includes:

applying to the machine learning model information regarding network service providers of the devices and user identifiers of users of the devices from the collected network bandwidth usage data, and analyzing a data frame having a network comparison vector and an existing networks vector, wherein the network comparison vector is a chart of varying signal data based on the computer device polling existing networks within a vicinity of a user of the first device.

14. The computer program product of claim 13, wherein the program instructions are executable to update a digital wallet of a user of the second device for the pass-through network bandwidth sharing.

15. The computer program product of claim 13, wherein the program instructions are executable to classify, by the computer device, the collected network bandwidth usage data for the training of the machine learning model.

16. The computer program product of claim 14, wherein the program instructions are executable to pick a network of existing networks within a vicinity of the first device.

17. A system comprising:

a processor, a computer readable memory, one or more computer readable storage media, and program instructions collectively stored on the one or more computer readable storage media, the program instructions executable to:

establish thresholds for tethering between devices;

collect network bandwidth data and polling data from the devices;

train a machine learning model in view of the collected network bandwidth data and the polling data;

predict a zone of network interruption for a first device of the devices;

locate the devices along a path;

proactively poll at least one device of the devices along the path for pass-through network bandwidth sharing; and automatically tether the first device to a second device in response to the thresholds being met for the pass-through network bandwidth sharing for the first device, wherein the training the machine learning model includes:

applying to the machine learning model information regarding network service providers of the devices and user identifiers of users of the devices from the collected network bandwidth usage data, and analyzing a data frame having a network comparison vector and an existing networks vector, wherein the network comparison vector is a chart of varying signal data based on the computer device polling existing networks within a vicinity of a user of the first device.

18. The system of claim 17, wherein the collecting the network bandwidth data and the polling data from the devices includes collecting GPS data and signal strength data from the devices.

19. The system of claim 17, wherein the program instructions are executable to determine network dead zones from the GPS data and the signal strength data.

20. The system of claim 17, wherein the locating the devices includes accessing calendars of the users of the devices.

* * * * *